United States Patent [19]

Chatani

[11] Patent Number: 5,493,557
[45] Date of Patent: Feb. 20, 1996

[54] DEVICE FOR RECORDING AND RETRIEVING OF MANUALLY INPUTTED DATA WITH A TIMING SIGNAL IN AN OPTICAL STORAGE MEDIUM

[75] Inventor: Masayuki Chatani, Tokyo, Japan

[73] Assignee: Sony Corporation, Tokyo, Japan

[21] Appl. No.: 220,817

[22] Filed: Mar. 30, 1994

[30] Foreign Application Priority Data

Mar. 31, 1993 [JP] Japan ................................ 5-073686

[51] Int. Cl.$^6$ ............................. G11B 7/00; G06K 9/18
[52] U.S. Cl. ..................... 369/124; 369/275.3; 382/315
[58] Field of Search ............................... 369/124, 275.3; 382/187, 315, 313, 314

[56] References Cited

U.S. PATENT DOCUMENTS

| | | | |
|---|---|---|---|
| 5,113,452 | 5/1992 | Chatani et al. | 382/13 |
| 5,157,737 | 10/1992 | Sklarew | 382/315 |
| 5,166,666 | 11/1992 | Tanaka | 382/13 |
| 5,267,327 | 11/1993 | Hirayama | 382/187 |

FOREIGN PATENT DOCUMENTS 2145547  3/1985  United Kingdom ............. G06F 3/02

OTHER PUBLICATIONS

Patent Abstracts of Japan, vol. 14, No. 349 (P-1084), 27 Jul. 1990 & JP-A-02 125 367 (NTT), 14 May 1990.

Primary Examiner—Georgia Y. Epps
Assistant Examiner—Kim-Kwok Chu
Attorney, Agent, or Firm—Limbach & Limbach; Philip M. Shaw, Jr.

[57] ABSTRACT

An information processor comprising a tablet for inputting script data; a timer for outputting a time signal; a RAM as a temporary storage means; a CPU responsive to every input of the script data from the tablet and storing in the RAM both the input script data and the time signal being outputted at that instant from the timer; and a magneto-optical recorder/reproducer for writing, on a disc as a recording medium, the time signal and the script data stored in the RAM. The information processor is capable of reproducing the script data in any of various modes inclusive of real time reproduction of each stroke, 10-stroke batch reproduction and 10-second batch reproduction, and can be formed into a small-sized structure while being equipped with a RAM of a great storage capacity.

9 Claims, 13 Drawing Sheets

DEVICE FOR RECORDING AND RETRIEVING OF MANUALLY INPUTTED DATA WITH A TIMING SIGNAL IN AN OPTICAL STORAGE MEDIUM

BACKGROUND OF THE INVENTION

1. Field of the Invention

The present invention relates to an information processor adapted for realizing a small-sized portable computer.

2. Description of the Related Art

In a portable computer having a pen interface with a script input and reproduce function, it is necessary to hold script data which requires a greater storage capacity in comparison with other data such as character code and so forth. More specifically, the sampling rate in a tablet is generally 100 points/second or so, and therefore a total of 400 bytes are needed per second if 2 bytes are allocated to X and Y coordinates of each point. Supposing that 1 stroke (from pen-down to pen-up) is written in 0.2 second on the average, the storage capacity required per stroke amounts to 80 bytes. In an example where 1 character is written with 8 strokes on the average, the total required capacity per character amounts to 80×8=640 bytes. Since a character code is expressed by 2 bytes according to the JIS code or Shift JIS code, it follows that the required storage capacity becomes approximately 300 times. Although the amount of script data can be compressed and reduced by curtailing the points thereof, it is still impossible to preserve the data in the storage capacity equal to that for the character code.

In any portable computer for processing script data as described above, it is essential to incorporate a great-capacity memory and also a random access memory due to the necessity of editing and/or partially erasing the script data. In view of this point, the following problems are existent with regard to the read/write memory means used heretofore.

(1) In use of magnetic tape:

The performance is not satisfactory in respect of the random access time and, in reproducing the recorded script data, a considerable time is spent for cueing the same. And in the process of partially erasing the recorded data and rewriting some other data, there is a restriction that the new data needs to be smaller in size than the former data.

(2) In use of magnetic hard disc:

Fundamentally, adequate flexibility is not attainable in interchanging the data with an external apparatus since it is impossible to take out a recording medium and replace the same, whereby the script data is not interchangeable with facility. Script data of a relatively great content requires a memory having a great storage capacity, so that the requisite is not satisfied completely with respect to the storage capacity either.

(3) In use of semiconductor card memory:

When a semiconductor memory is used, it is possible to form both a read-only area, a write-only area and a read/write area in the same card and to store a protected program in the read-only area for prohibition of copying and alteration. However, the storage capacity is generally small and not sufficient to hold the script data.

For enabling a user to see the script data by a variety of methods, the portable computer for processing the script data needs to be capable of performing its operation in various modes such as a real time reproduce mode for reproducing the script data at the same speed as the input speed, a batch reproduce mode for reproducing the data by unitary 10 strokes, and a batch reproduce mode for reproducing the data by unitary 10 seconds.

SUMMARY OF THE INVENTION

It is an object of the present invention to provide an information processor which is capable of reproducing script data in a variety of modes and is formable into a down-sized structure while being equipped even with a random access memory of a great storage capacity.

According to one aspect of the present invention, there is provided an information processor which comprises an input means such as a tablet for inputting script data, a time signal generating means such as a timer for outputting a time signal, a temporary memory means such as a RAM, a processing means such as a CPU responsive to every input of the script data fed from the input means and storing both the script data and the time signal being outputted at that instant from the time signal generating means, and a recording/reproducing means such as a magneto-optical recorder/reproducer for writing on a disc recording medium the script data and the time signal stored in the temporary memory means.

In the information processor of the present invention, the script data and the time signal outputted from the time signal generating means are written on the disc recording medium every time the script data is fed from the input means. Therefore the script data can be reproduced in any of various modes, and the processor can be formed into a small-sized structure while being equipped with a random access memory of a great storage capacity. Moreover, further down-sizing is realized by the use of, in the recording/reproducing means, a recording medium known as Mini Disc (MD: tradename) where data is recorded by the technique of magnetic-modulation direct overwriting.

The above and other features and advantages of the present invention will become apparent from the following description which will be given with reference to the illustrative accompanying drawings.

DESCRIPTION OF THE PREFERRED EMBODIMENT

Hereinafter the present invention will be described in detail with reference to an embodiment thereof shown in the accompanying drawings.

Figure 1:
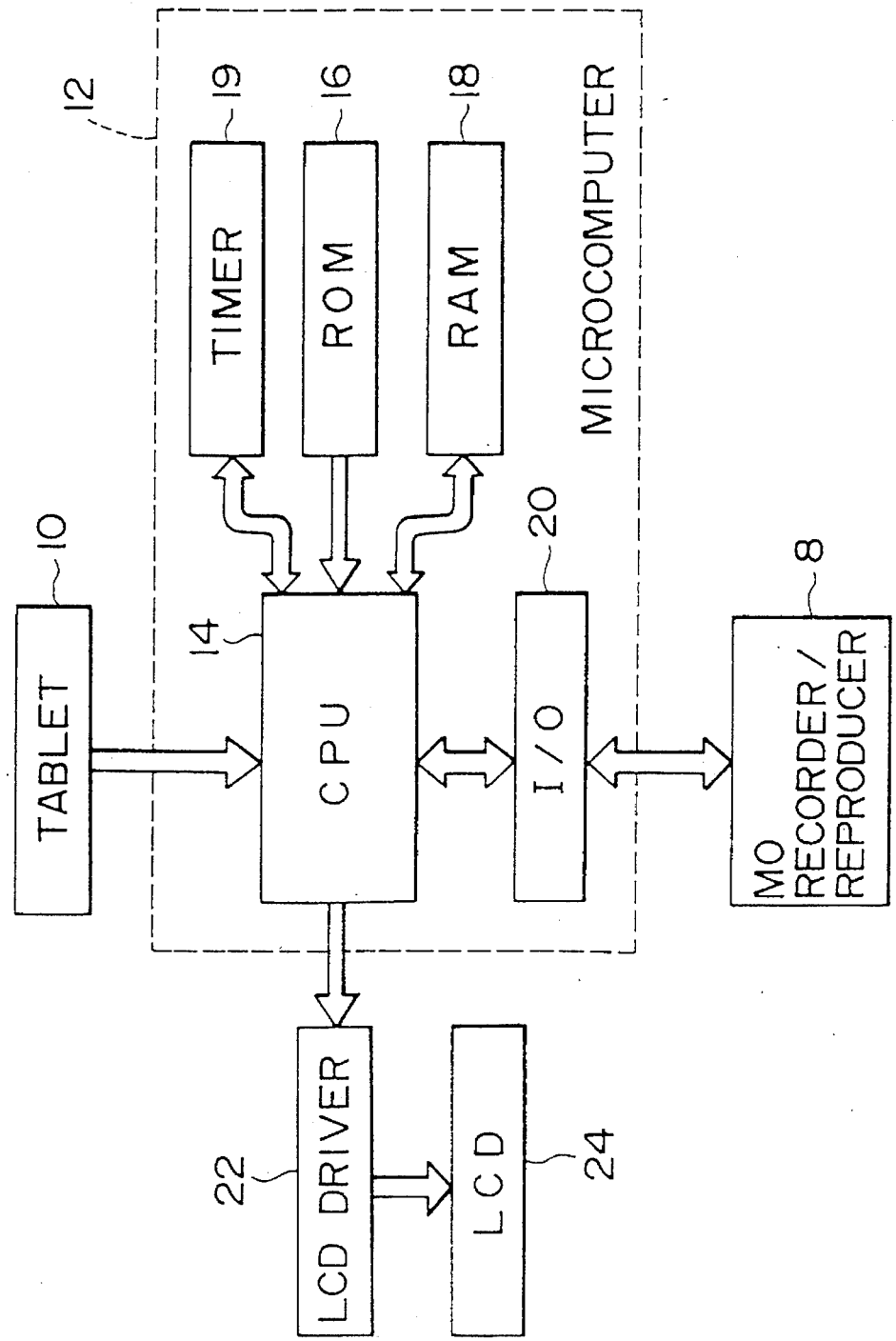
FIG. 1 is a block diagram showing the constitution of an embodiment which represents the information processor of the present invention.

FIG. 1 is a block diagram showing the constitution of a preferred embodiment which represents the information processor of the invention. In this diagram, a tablet 10 is a pressure-sensitive type capable of outputting data which corresponds to the X-Y coordinate values of the position pressed by a user's finger or a pen (e.g., pen 30 in FIG. 3). The data outputted from the tablet 10 is supplied to a microcomputer 12.

The microcomputer 12 comprises a CPU 14; a ROM 16 where a program to be used by the CPU 14 is stored in advance; a RAM 18 used as a work area; an external peripheral device (not shown) a timer 19 for generating a time signal; and an input/output interface 20 for transferring various data to and from the CPU 14.

A magneto-optical recorder/reproducer 8 records on a disc the data supplied thereto via the input/output interface 20, and supplies the reproduced data from the disc to the input/output interface 20.

An LCD (liquid crystal display) driver 22 drives an LCD device 24 in accordance with the display data supplied from the microcomputer 12, so that the content to be displayed on the LCD device 24 is controlled by the microcomputer 12.

Figure 2:
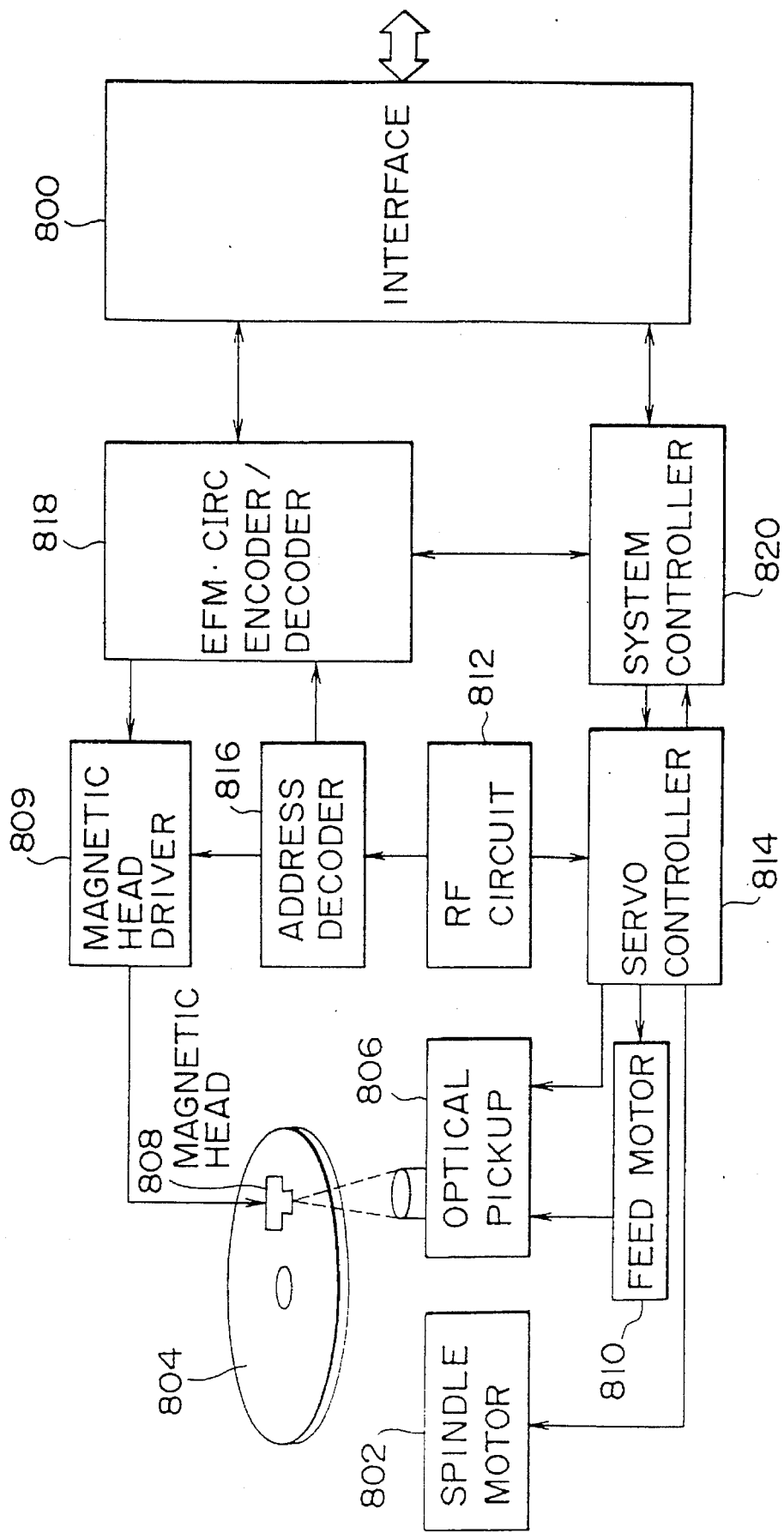
FIG. 2 is a block diagram showing the constitution of a magneto-optical recorder/reproducer in the embodiment of FIG. 1.

FIG. 2 shows an exemplary constitution of the magneto-optical recorder/reproducer 8 included in the apparatus of FIG. 1. The magneto-optical recorder/reproducer 8 of FIG. 2 is designed on the basis of the Mini Disc (tradename) system developed originally to be used for a personal audio appliance (portable type, stationary type and automobile type). The Mini Disc system employs, as a recording medium housed in a cartridge (72 mm wide, 68 mm long and 5 mm high), a read (reproduce)-only optical disc having a diameter of 64 mm, or a read/write (i.e., rewritable) magneto-optical (MO) disc, or a partial ROM (hybrid) disc having a read/write (rewritable) area and a read-only area. On an MO disc or a partial ROM disc, a data recording operation is performed by the technique of magnetic-modulation direct overwriting. In the case of a read-only optical disc, a signal to be reproduced is detected by utilizing the phenomenon of light diffraction in a pit row of a desired track according to the theory applied to the known compact disc (CD). Meanwhile in the case of a read/write magneto-optical disc, a signal to be reproduced is detected through detection of the difference in the polarized-light angle (Kerr rotation angle) of the reflected light from a desired track. And in the case of a partial ROM disc, a signal to be reproduced in the read-only area is detected by utilizing the phenomenon of light diffraction in a pit row of a desired track, whereas a signal to be reproduced in the read/write area is detected through detection of the difference in the polarized-light angle (Kerr rotation angle) of the reflected light from a desired track.

Such magneto-optical recorder/reproducer 8 known as Mini Disc system is constituted of a down-sized lightweight structure achieved with the progress of development as a personal audio appliance where the circuit elements are highly integrated and the component parts of the individual mechanisms are optimized, so that even a battery-powered operation is possible due to the minimized power consumption. The recorder/reproducer 8 has a storage capacity of 140 Mbytes approximately equal to that of the known 3.5-inch MO disc drive and therefore enables interchange with other recording media. It is further possible to reduce the manufacture cost of the apparatus itself and the recording media as well in comparison with any other MO disc drive due to the accomplishment of enhanced mass production, and superior reliability is completely verified on the basis of the actual result achieved in the use as a personal audio appliance.

In this embodiment, the magneto-optical recorder/reproducer 8 employs a read/write type, i.e., rewritable magneto-optical (MO) disc 804. The magneto-optical recorder/reproducer 8 is controlled by the CPU 14 via the input/output interface 20 and reads out the data from the magneto-optical disc 804 in response to a read command from the CPU 14 and then transfers the data to the CPU 14, or writes the data on the magneto-optical disc in response to a write command from the CPU 14.

In the magneto-optical recorder/reproducer 8 of FIG. 2, a modulating magnetic field corresponding to the record data is applied to a magnetic head 808 in a state where a laser beam is irradiated by an optical pickup 806 to the magneto-optical disc 804 being rotated by a spindle motor 802, so that the data is recorded by magnetic-field modulation overwriting along a record track on the magneto-optical disc. And the data is reproduced magneto-optically while a desired track on the magneto-optical disc 804 is traced by the laser beam emitted from the optical pickup 806.

The optical pickup 806 comprises a laser beam source such as a laser diode, a collimator lens, an objective lens, a polarized beam splitter, optical parts inclusive of a cylindrical lens, and a photo detector divided into predetermined arrangement. The optical pickup 806 is placed by a feed motor 810 at a position opposite to the magnetic head 808 through the magneto-optical disc 804.

When data is recorded on the magneto-optical disc 804 by the optical pickup 806, the magnetic head 808 is driven by a magnetic head driver 809, and a modulating magnetic field corresponding to the record data is irradiated to a desired track on the magneto-optical disc 804, whereby the data is recorded thermo-magnetically.

The optical pickup 806 detects a focus error by the astigmatic method or the like through detection of the laser beam irradiated to the desired track, and also detects a tracking error by the push-pull method or the like. And when the data is reproduced from the magneto-optical disc 804, the optical pickup 806 detects the difference in the polarized-light angle (Kerr rotation angle) of the reflected beam from the desired track, thereby outputting a reproduced signal.

The output of the optical pickup 806 is supplied to an RF circuit 812, which then extracts the focus error signal and the tracking error signal from the output of the optical pickup 806 and supplies the extracted signals to a servo controller 814. The RF circuit 812 further serves to convert the reproduced signal into a binary form and supplies the same to an address decoder 816. Then this decoder 816 decodes the address from the binary reproduced signal and supplies the decoded address to an EFM.CIRC encoder/decoder 818 while supplying thereto also the binary reproduced data other than the data relative to the address.

The servo controller 814 comprises, for example, a focus servo control circuit, a tracking servo control circuit, a spindle motor servo control circuit and a sled servo control circuit.

The focus servo control circuit executes a focus control action for the optical device of the optical pickup 806 in a manner to reduce the focus error signal to zero. The tracking servo control circuit executes a control action for the feed motor 810 of the optical pickup 806 in a manner to reduce the tracking error signal to zero.

Meanwhile the spindle motor servo control circuit controls the spindle motor 802 in such a manner that the disc 804 is driven at a predetermined rotation rate (e.g., constant linear velocity). And the sled servo control circuit moves the magnetic head 808 and the optical pickup 806 by the feed motor 810 to the position of a desired track on the disc 804 designated by a system controller 820.

The EFM.CIRC encoder/decoder 818 encodes the data, which is supplied thereto via the interface 800, for error correction by the CIRC (cross interleave Reed-Solomon code) and further encodes the supplied data by EFM (eight-to-fourteen modulation) so that the data is modulated to be properly recordable.

The encoded data obtained from the EFM.CIRC encoder/decoder 818 is supplied as record data to the magnetic head driver 809, which then drives the magnetic head 808 in such a manner that a modulating magnetic field corresponding to the record data is applied to the disc 804.

The system controller 820 controls the recording position on the disc 804 in response to a write command received from the CPU 14 via the interface 800 so that the data is recorded on the track of the disc 804. The action of such recording position control is so executed that the encoded data outputted from the EFM.CIRC encoder/decoder 818 is positionally regulated on the disc 804 by the system controller 820, and a control signal for designating the recording position on the track of the disc 804 is supplied from the system controller 820 to the servo controller 814.

In the reproduce mode, the EFM.CIRC encoder/decoder 818 demodulates the EFM binary data inputted thereto and also executes CIRC decoding for error correction, and then outputs the processed data to the interface 800.

In response to a read command received from the CPU 14 via the interface 800, the system controller 820 controls the reproducing position on the record track of the disc 804 in a manner that reproduced data can be obtained continuously. The action of such reproducing position control is so executed that the position of the data to be reproduced on the disc is regulated by the system controller 820, and a control signal for designating the reproducing position on the record track of the disc 804 is supplied to the servo controller 814.

Figure 3:
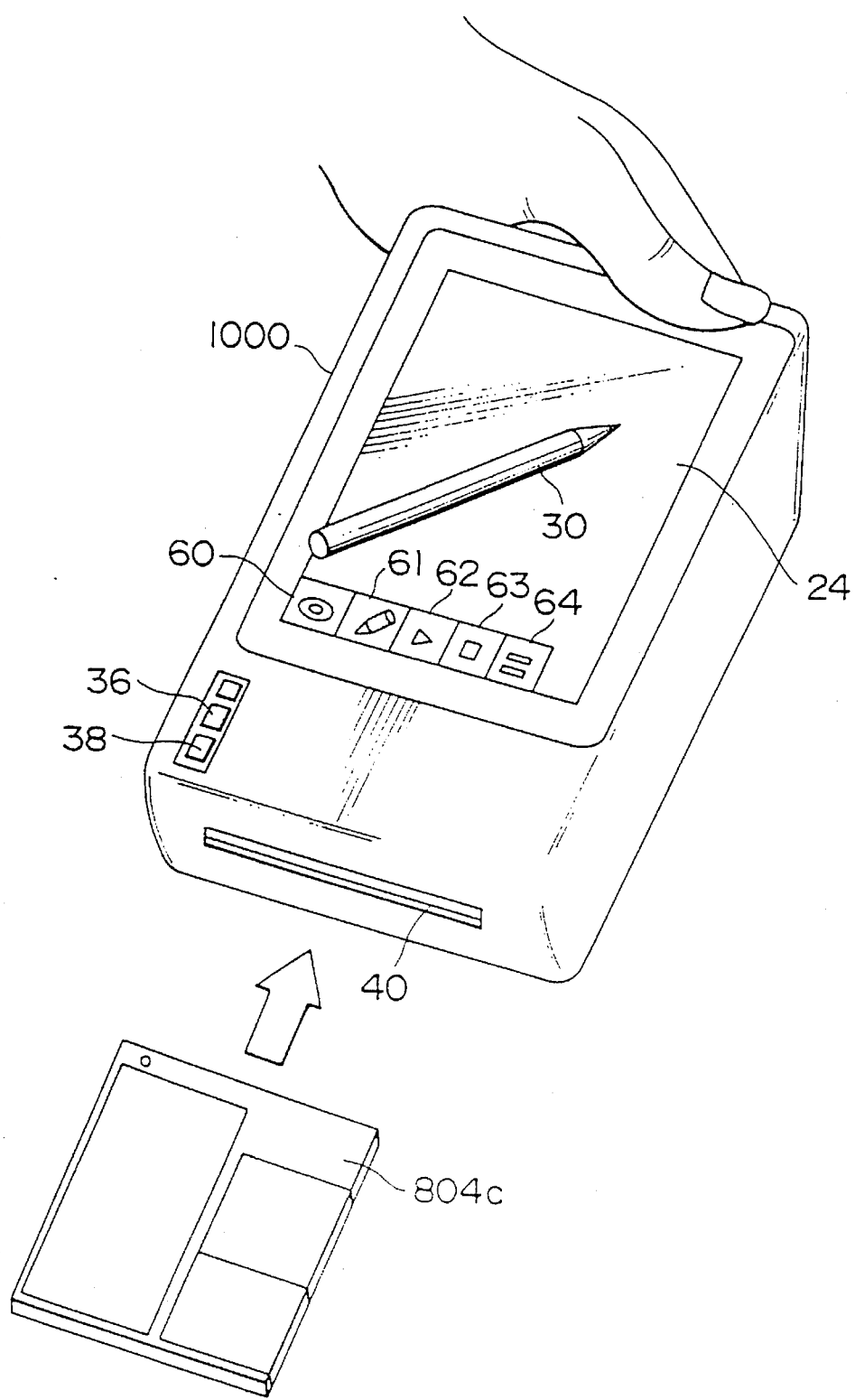
FIG. 3 is a perspective view illustrating the whole embodiment of FIG. 1.

FIG. 3 is a perspective view of an embodiment representing a small-sized information processor 1000 of the present invention where the entire component elements shown in FIG. 1 are housed in a single case. A disc cartridge 804C containing a disc 804 therein is loaded through a slot 40 of the information processor 1000. A tablet 10 is disposed on the screen of an LCD 24, and coordinate values of a point indicated by means of a pen 30 are supplied to a microcomputer 12. An eject button 36 and a power button 38 are disposed at the front left end of the screen of the LCD 24. When the eject button 36 is depressed, the cartridge 804C containing the disc 804 therein is ejected from the slot 40. The power supply is turned on or off when the power button 38 is depressed.

A reproduce mode select button 60, an input mode button 61, a reproduce start button 62, a reproduce stop button 63 and a reproduce pause button 64 are displayed as icons at the lower end of the screen of the LCD 24. When the reproduce mode select button 60 is first indicated by the pen 30, a 10-stroke batch reproduce mode is selected. The next indication by the pen 30 selects a real time reproduce mode, and the following indication by the pen 30 selects a 10-second batch reproduce mode. And when the button 60 is further indicated by the pen 30, selection returns to the first 10-stroke batch reproduce mode. In this manner, the selecting operation is performed cyclically. When the input mode button 61 is indicated by the pen 30, an input mode is selected. And when the reproduce start button 62 is indicated by the pen 30, reproduction is started. Such reproduction is brought to a stop if the reproduce stop button 63 is indicated by the pen 30. And the reproduction is paused if the reproduce pause button 64 is indicated by the pen 30.

Figure 4A:
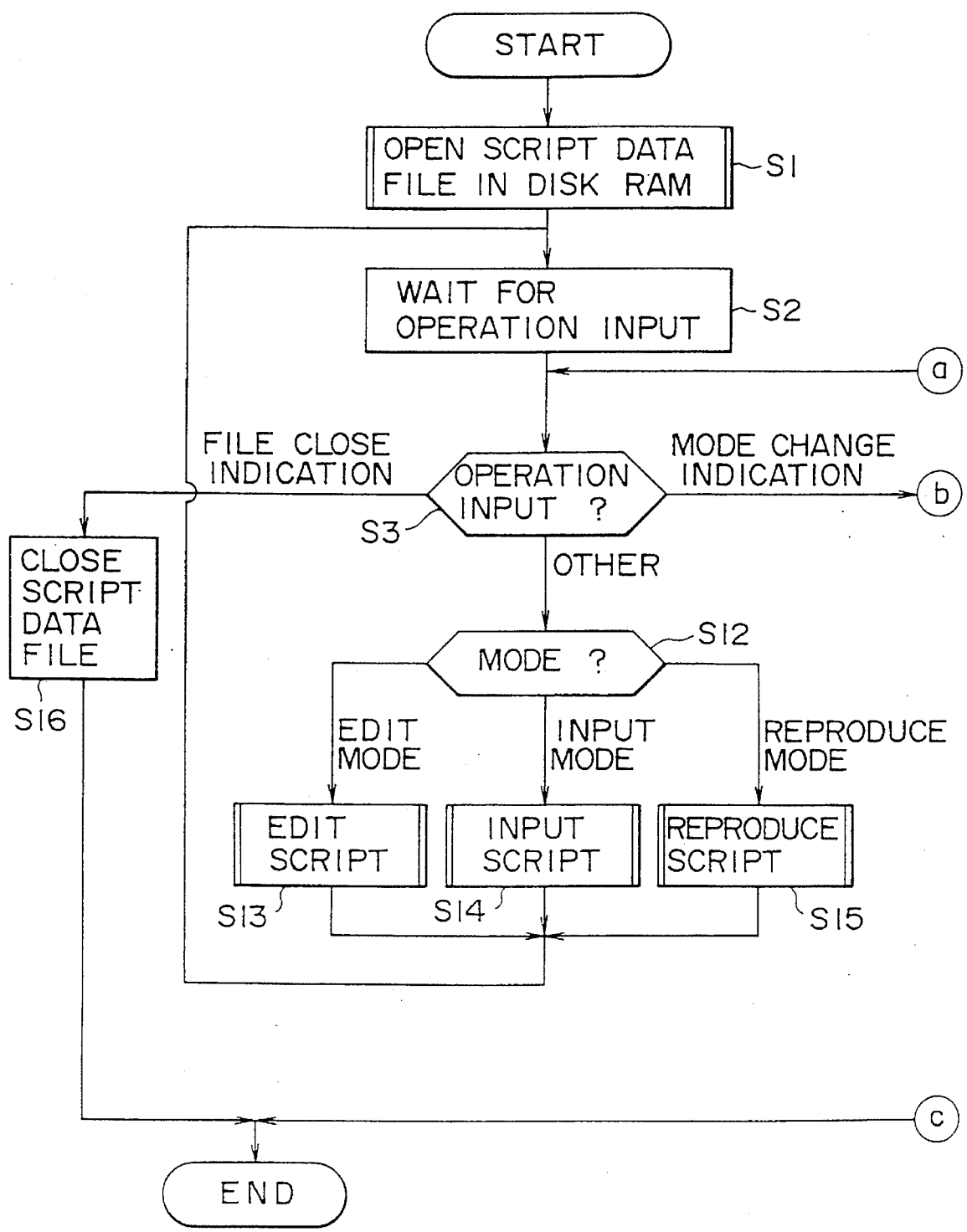
FIGS. 4(a) through 4(b) are flow charts of an exemplary procedure for processing script data in the embodiment of FIG. 1.
Figure 4B:
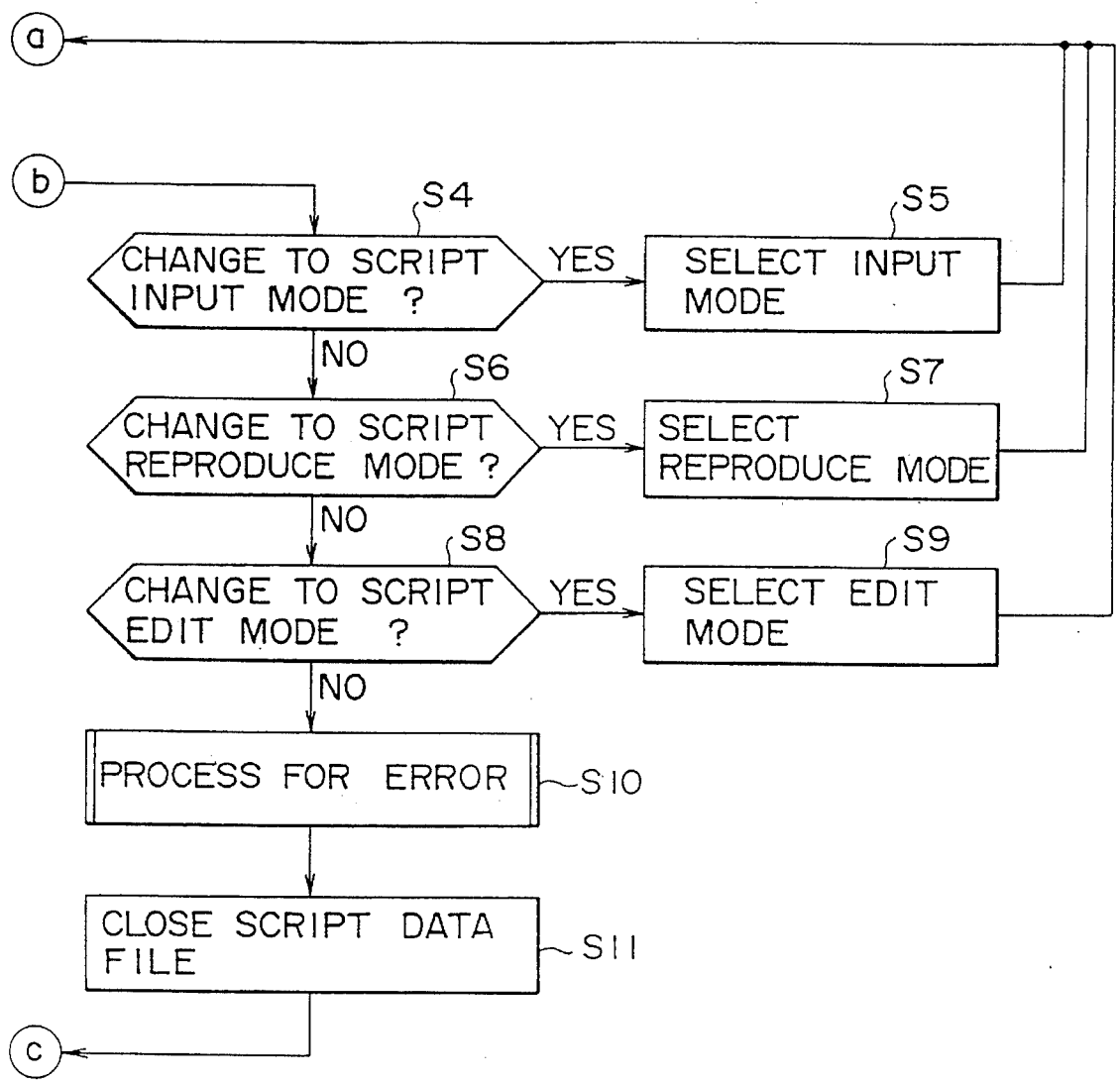

FIGS. 4A and 4B are is a flow chart of an exemplary procedure for processing script data in the embodiment of FIG. 1. First the CPU 14 opens a script data file recorded on the loaded magneto-optical disc which is a RAM disc in this example (step S1). Then the CPU 14 waits for an input from the pen 30 manipulated by a user (step S2). If the input indication by the user signifies a mode change to a script input mode (steps S3 and S4), the CPU 14 selects the input mode (step S5). If the input indication signifies a change to a script reproduce mode (steps S3 and S6), the CPU 14 selects the reproduce mode (step S7). When the input indication signifies a change to a script edit mode (steps S3 and S8), the CPU 14 selects the edit mode (step S9). When the mode change indication by the user signifies a change to none of the script input mode, the script reproduce mode and the script edit mode, the CPU 14 executes a process for error (step S10) and closes the script data file (step S11).

When the user's indication signifies the edit mode (steps S3 and S12), the CPU 14 executes a process to edit the script data (step S13). If the user's indication signifies the input mode (steps S3 and S12), the CPU 14 executes a process to input the script data (step S14). Meanwhile if the user's indication signifies the reproduce mode (steps S3 and S12), the CPU 14 executes a process to reproduce the script data (step S15).

In case the user's indication signifies a close of the file (step S3), the CPU 14 closes the script data file (step S16).

Figure 5:
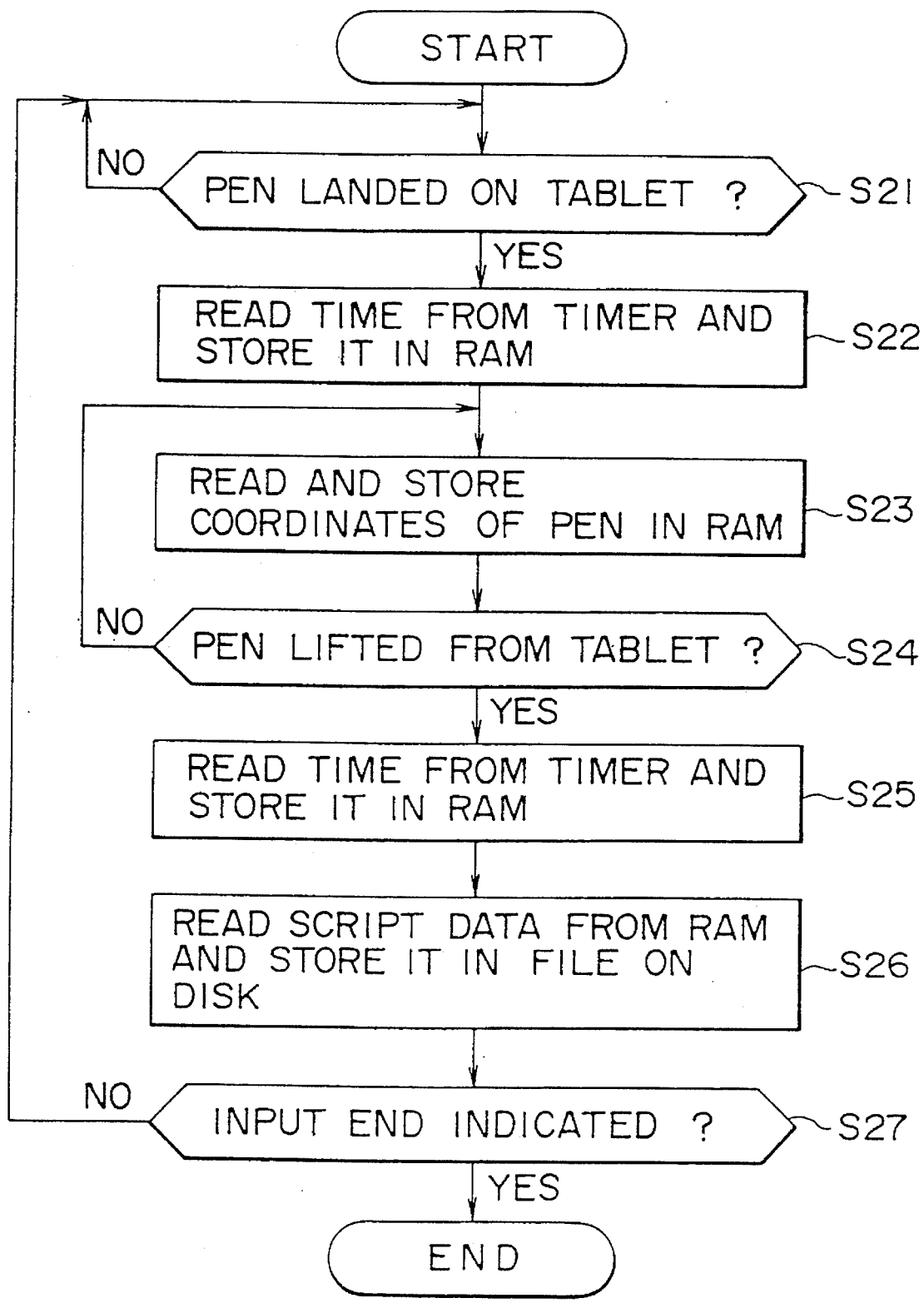
FIG. 5 is a flow chart of an exemplary procedure for inputting script data in the embodiment of FIG. 1.

FIG. 5 is a flow chart of an exemplary procedure for inputting script data in the embodiment of FIG. 1. When the pen 30 is landed on the tablet 10 (YES at step S21), the CPU 14 reads the time signal being outputted from the timer 19 at that instant, then stores such time signal in the RAM 18 (step S22), and also stores in the RAM 18 the script data of the coordinate values traced by the pen 30 until lift-up of the pen 30 from the tablet 10 (steps S23 and S24).

Figure 7:
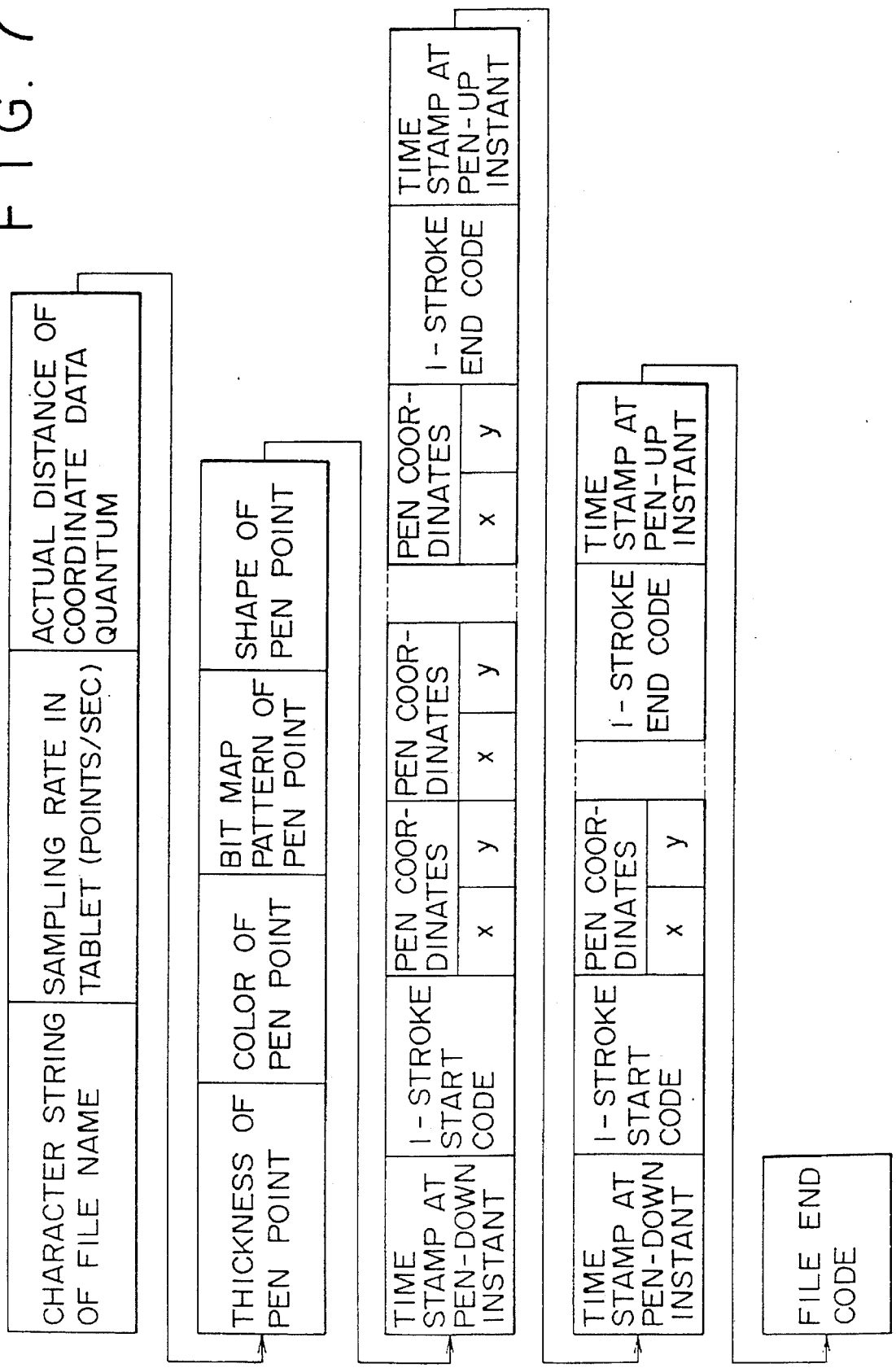
FIG. 7 shows an exemplary format of a script data file used in the embodiment of FIG. 1.
Figure 8:
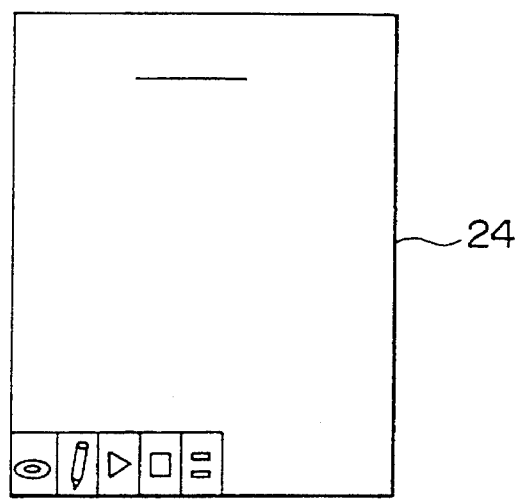
FIG. 8 illustrates a display example of a let stroke in a real-time reproduce mode in the embodiment of FIG. 1.
Figure 9:
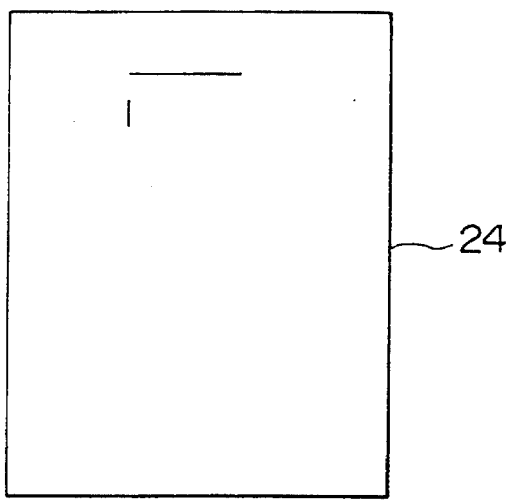
FIG. 9 illustrates a display example of a 2nd stroke in the real-time reproduce mode in the embodiment of FIG. 1.
Figure 10:
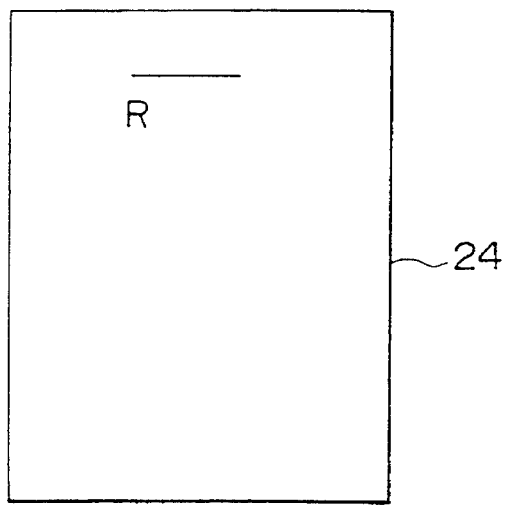
FIG. 10 illustrates a display example of a 3rd stroke in the real-time reproduce mode in the embodiment of FIG. 1.
Figure 11:
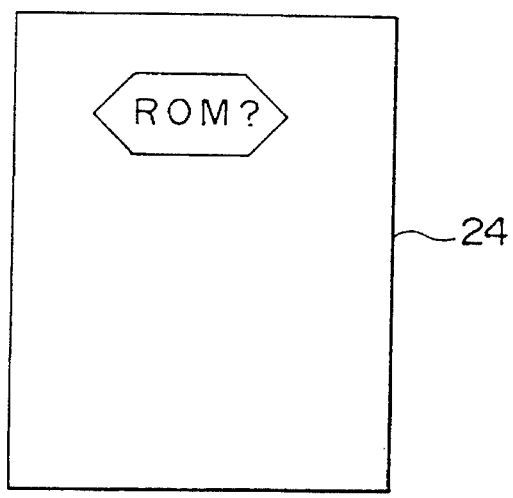
FIG. 11 illustrates a display example of a 10th stroke in the real-time reproduce mode in the embodiment of FIG. 1.
Figure 12:
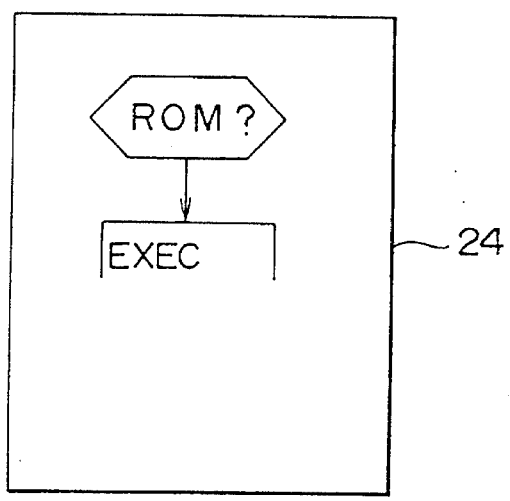
FIG. 12 illustrates a display example of a 20th stroke in the real-time reproduce mode in the embodiment of FIG. 1.
Figure 13:
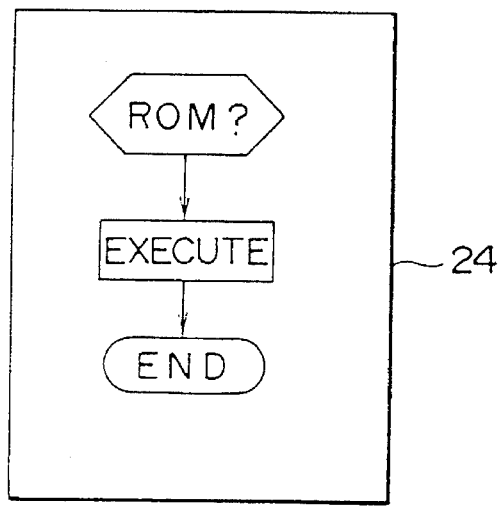
FIG. 13 illustrates a display example of the last stroke in the real-time reproduce mode in the embodiment of FIG. 1.

Subsequently when the pen 30 is lifted up from the tablet 10 (YES at step S24), the CPU 14 reads the time signal being outputted from the timer 19 at that instant and stores such time signal in the RAM 18 (step S25). Thereafter the CPU 14 reads out from the RAM 18 the script data of the coordinate values traced by the pen 30 and also the time signal anterior and posterior thereto, and then records the same in the script data file on the disc 804 in the magneto-optical recorder/reproducer 8. FIG. 7 shows an exemplary format of the script data file recorded as mentioned on the disc 804. As shown in FIG. 7, the script data represented by a row of the pen coordinate values is stored between the pen-down time stamp (time signal) and the pen-up time stamp.

Figure 6:
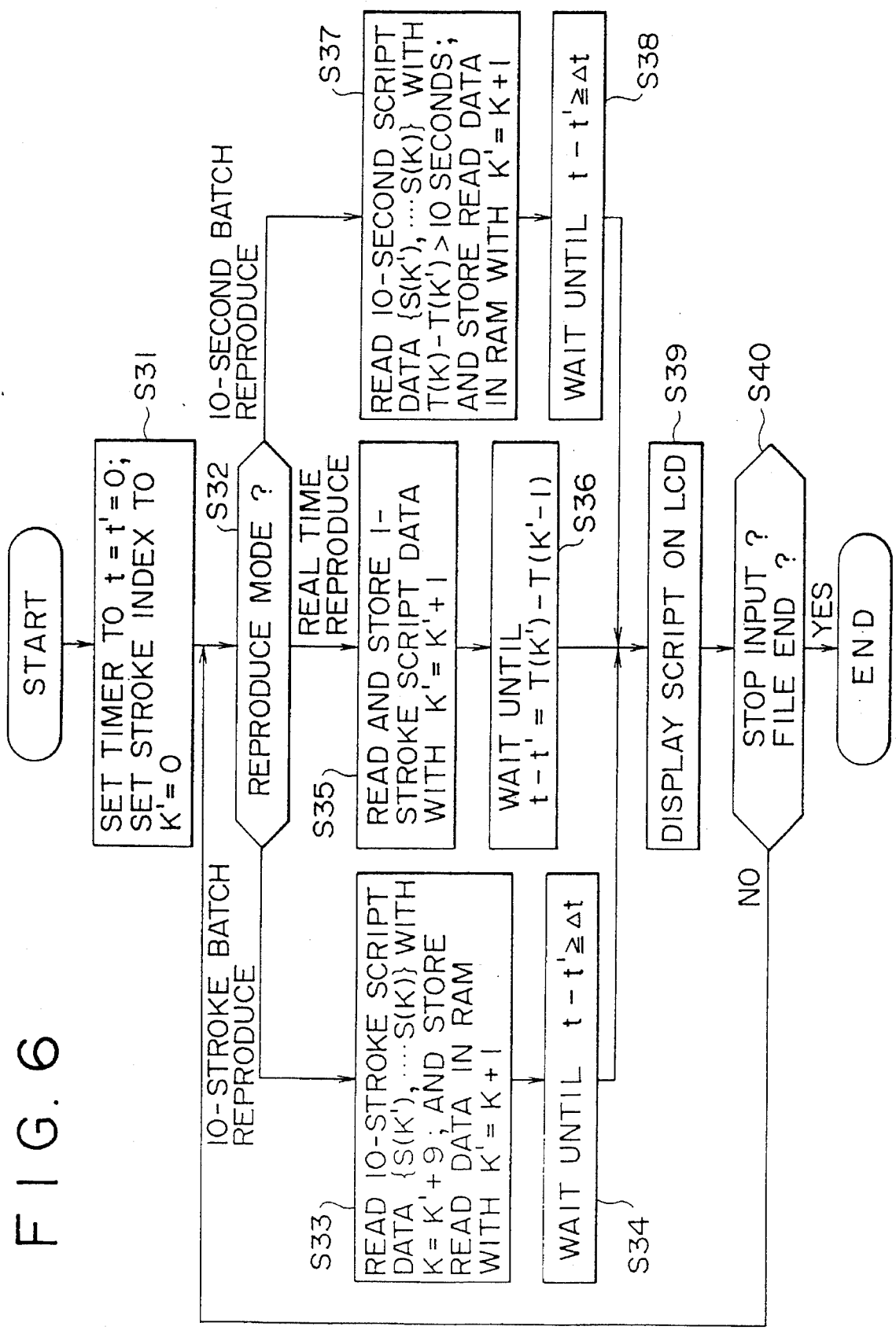
FIG. 6 is another flow chart of an exemplary procedure for reproducing the script data in the embodiment of FIG. 1.

FIG. 6 is a flow chart of an exemplary procedure for reproducing the script data in the embodiment of FIG. 1. First the CPU 14 sets the timer 19 to 0 and also the stroke index to 0 (step S31), and decides the selected reproduce mode from the indication executed to the reproduce-mode select button 60 by the pen 30 (step S32).

Figure 14:
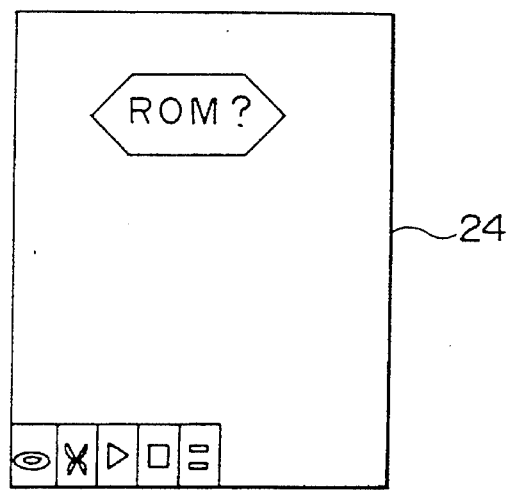
FIG. 14 illustrates a display example of first 10 strokes in a 10-stroke batch reproduce mode in the embodiment of FIG. 1.
Figure 15:
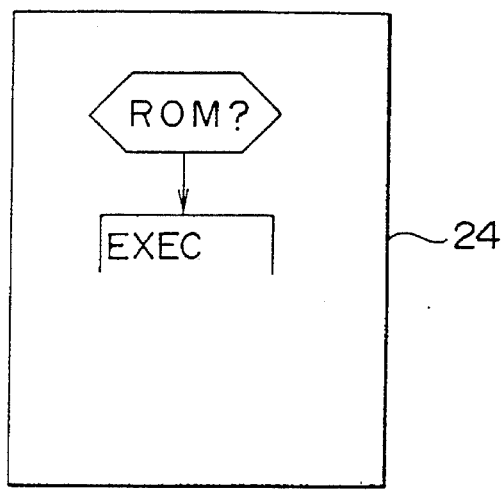
FIG. 15 illustrates a display example of the next 10 strokes after the lapse of a predetermined time interval from the first 10-stroke display in the 10-stroke batch reproduce mode in the embodiment of FIG. 1.
Figure 16:
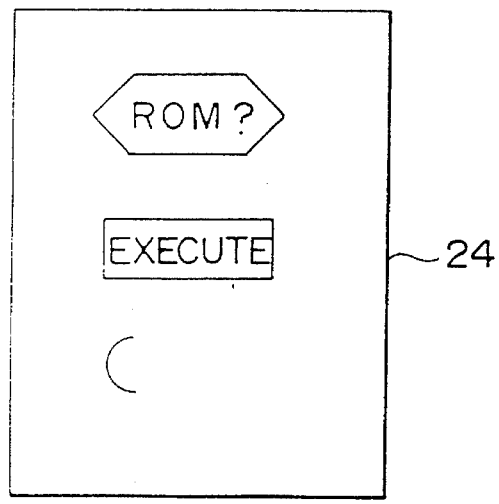
FIG. 16 illustrates a display example of the following 10 strokes after the lapse of a predetermined time interval from the second 10-stroke display in the 10-stroke batch reproduce mode in the embodiment of FIG. 1.
Figure 17:
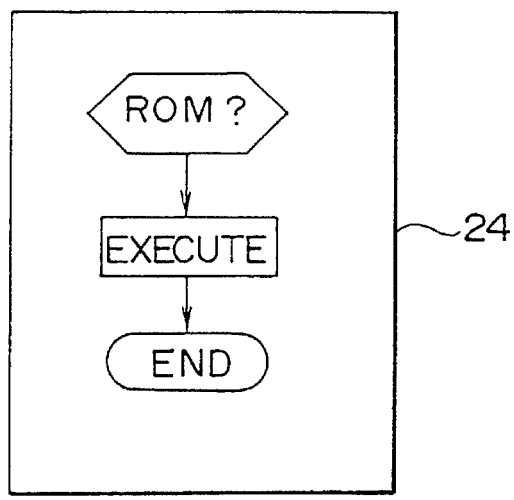
FIG. 17 illustrates a display example of the entire remaining script data after the lapse of a predetermined time interval from the third 10-stroke display in the 10-stroke batch reproduce mode in the embodiment of FIG. 1.

When the indication signifies selection of the 10-stroke batch reproduce mode, the CPU 14 first reads out the script data of 10 strokes from the disc 804, i.e., the script data $\{S(k'), \ldots S(k)\}$ with the index $k=k'+9$, and stores the read script data in the RAM 18 with the index $k'=k+1$ (step S33). In the above, k' denotes the stroke index of the script data displayed immediately before, and S(k) denotes the kth script data. Thereafter the CPU 14 waits until $t-t' \geq _\Delta t$ (step S34), and displays the script data on the LCD 24 (step S39). In the above, t stands for the time outputted from the timer 19; t' for the time when the script data is displayed immediately before; and $_\Delta t$ for the time interval in the batch reproduce mode. FIG. 14 illustrates a display example of first 10 strokes in the 10-stroke batch reproduce mode, and FIG. 15 illustrates a display example of the next 10 strokes after the lapse of a predetermined time interval from the first 10-stroke display in the 10-stroke batch reproduce mode. FIG. 16 illustrates a display example of the following 10 strokes after the lapse of a predetermined time interval from the second 10-stroke display in the 10-stroke batch reproduce mode, and FIG. 17 illustrates a display example of the entire remaining script data after the lapse of a predetermined time interval from the third 10-stroke display in the 10-stroke batch reproduce mode.

In response to selection of the real time reproduce mode, the CPU 14 reads out the script data of 1 stroke from the disc 804 and stores the data in the RAM 18 with the index $k'=k+1$ (step S35). Thereafter the CPU waits until the time t elapses to $$t-t' \geq T(k')-T(k'-1)$$

(step S36), and then displays the script data on the LCD 24 (step S39). In the above, T(k) denotes the time stamp relative to S(k). FIGS. 8, 9, 10, 11, 12 and 13 respectively show examples of 1st, 2nd, 3rd, 10th, 20th and last strokes displayed in the real time reproduce mode.

Figure 18:
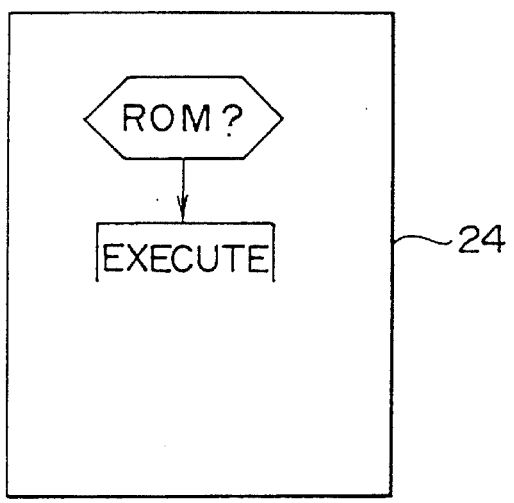
FIG. 18 illustrates a display example of first 10 seconds in a 10-second batch reproduce mode in the embodiment of FIG. 1.
Figure 19:
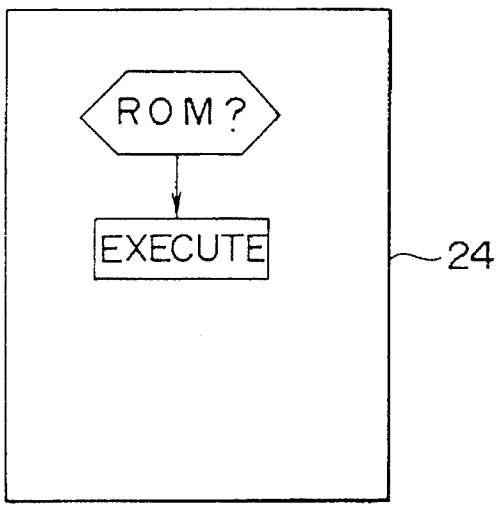
FIG. 19 illustrates a display example where script data of merely one stroke is inputted for the next 10 seconds following the first 10 seconds in the 10-second batch reproduce mode in the embodiment of FIG. 1.
Figure 20:
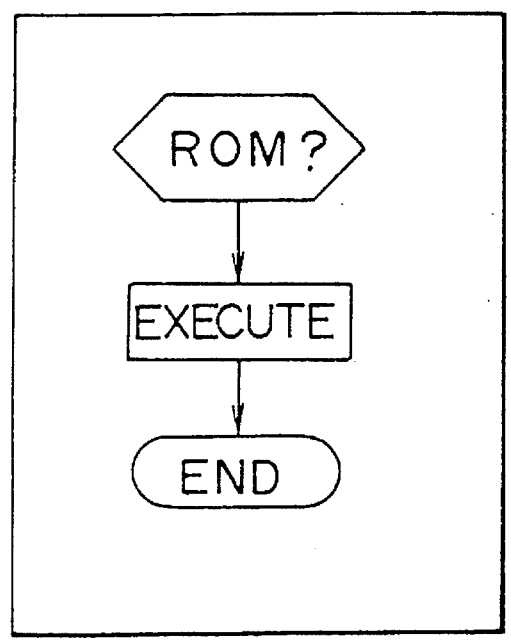
FIG. 20 illustrates another display example of the last 10 seconds in the 10-second batch reproduce mode in the embodiment of FIG. 1.

In response to selection of the 10-second batch reproduce mode, the CPU 14 reads out the script data of 10 seconds from the disc 804, i.e., the script data $\{S(k'), \ldots S(k)\}$ with the index $T(k)-T(k')>10$ seconds, and stores the read data in the RAM 18 with the index $k'=k+1$ (step S37). Thereafter the CPU 14 waits until the time elapses to $t-t'\Delta t$ (step S38), and displays the script data on the LCD 24 (step S39). FIG. 18 illustrates a display example of first 10 seconds in the 10-second batch reproduce mode; FIG. 19 illustrates a display example where merely 1-stroke script data is inputted for the next 10 seconds following the first 10 seconds in the 10-second batch reproduce mode; and FIG. 20 illustrates a display example of the last 10 seconds in the 10-second batch reproduce mode.

The procedure of the steps S32 to S39 mentioned above is repeated until the reproduce stop button 63 or the reproduce pause button 64 is indicated, or until the end of the file (YES at step S40).

In the embodiment described, transfer of data between the input/output device of the magneto-optical recorder/reproducer 8 and the RAM 18 is performed under control of the CPU 14. However, a DMAC (direct memory access controller) may be additionally provided to control the data transfer between the input/output device and the RAM 18 directly without passing the data via the CPU 14. Furthermore, it is also possible to use a partial ROM disc instead of the rewritable MO disc 804 and to record, in the read-only area thereof, a protected program which prohibits copying or alteration.

According to the information processor of the present invention, every time script data is fed from the input means, such script data and the time signal being outputted at that instant from the time signal generating means are written on a disc recording medium. Consequently, the processor is capable of reproducing the script data in any of various modes inclusive of real time reproduction of individual strokes one by one, 10-stroke batch reproduction and 10-second batch reproduction, and is further capable of realizing reproductive expression of the thinking process in the write mode. Besides the above, the processor can be formed into a small-sized structure while being equipped even with a random access memory of a great storage capacity. And since the recording/reproducing means employs a recording medium known as Mini Disc (MD) which is adapted for recording the data by the technique of magnetic-modulation direct overwriting, it becomes possible to achieve a further dimensional reduction of the apparatus.

What is claimed is:

1. A device for information processing comprising:
   an input means for inputting data including script data, the script data being input by one or more strokes of a writing implement;
   a time signal generating means for outputting a time signal representing time data;
   a temporary memory means;
   a processing means responsive to every stroke of the script data fed from said input means for storing in said memory means both the script data and the time signal being simultaneously outputted at that instant from said time signal generating means; and
   a recording/reproducing means for writing on a disc recording medium both the script data and the time signal stored in said temporary memory means.

2. The device for information processing according to claim 1, wherein said processing means perform batch reproduction of the script data of a predetermined number of strokes on the basis of the time signal and the script data read out from said disc recording medium by said recording/reproducing means.

3. The device for information processing according to claim 1, wherein said processing means reproduces the script data in a real time mode by sequentially reproducing one stroke of script data at a time at timed intervals on the basis of the time signal and the script data read out from said disc recording medium by said recording/reproducing means.

4. The device for information processing according to claim 1, wherein said processing means performs batch reproduction of the script data inputted during a predetermined time period on the basis of the time signal and the script data read out from said disc recording medium by said recording/reproducing means.

5. A device for information processing comprising:

tablet input means for inputting script data a stroke at a time by means of a pen implement;

a time signal generating means for outputting a time data signal;

a temporary memory means;

a processing means responsive to every input stroke of the script data fed from the input means for storing in the temporary memory means both the script data and the time data signal being simultaneously outputted from the time signal generating means.

6. A device according to claim 5, wherein the device comprises a recording/reproducing means for writing on a disc recording medium both the script data and the time data signal stored in the temporary memory means.

7. A device for information processing comprising:

an input means for inputting script data on a stroke by stroke basis;

a time signal generating means for outputting a time data signal representing sequential periods of time;

a temporary memory means;

a storage medium;

a recording/reproducing means for recording on the storage medium and reproducing therefrom; and a processing means operatively connected to the temporary memory means, the input means, the recording/reproducing means and the time signal generating means and responsive to every input stroke of the script data fed from the input means for storing in the temporary memory means both the script data and time data signal being outputted from the time signal generating means at the beginning and ending of every input stroke and thereafter causing the recording/reproducing means to record on the storage medium both the script data and the time data signal stored in the temporary memory means.

8. A device for information processing according to claim 7, wherein the processing means performs batch reproduction of the script data of a predetermined number of strokes on the basis of the time data signal and the script data read out from the storage medium by the recording/reproducing means.

9. A device for information processing according to claim 7, wherein the processing means performs batch reproduction of the script data input during a predetermined time period on the basis of the time data signal and the script data read out from the storage medium by the recording/reproducing means.

* * * * *